July 7, 1970    D. RIENZI ET AL    3,519,216

MANDREL

Filed Aug. 15, 1968    2 Sheets-Sheet 1

INVENTORS:
DOMINICK RIENZI
WILLIAM C. LOHREINK
BY
ATTORNEY

July 7, 1970  D. RIENZI ET AL  3,519,216

MANDREL

Filed Aug. 15, 1968  2 Sheets-Sheet 2

INVENTORS:
DOMINICK RIENZI
WILLIAM C. LOHREINK

BY

ATTORNEY

United States Patent Office 3,519,216
Patented July 7, 1970

3,519,216
MANDREL
Dominick Rienzi, Nutley, and William C. Lohrfink,
Livingston, N.J., assignors to Tosto Corporation,
Nutley, N.J., a corporation of New Jersey
Filed Aug. 15, 1968, Ser. No. 752,921
Int. Cl. B65h *17/02*
U.S. Cl. 242—68.2                                     6 Claims

ABSTRACT OF THE DISCLOSURE

A mandrel for use with large rolls of sheet material wherein two mandrels are placed on opposite sides of the roll within the core thereof. The mandrels each have a key opening along the axis thereof for mating with the shaft of the driving apparatus for the roll. The mandrel is manufactured of an elastic material so that it can be deformed when forced and wedged into position within the core of the roll, which material will return to its original shape after use. Further, an endless stress bearing non-elastic ring is made integral with the mandrel and conforming to the inner surface of the key opening so as to retain the mandrel on the shaft of the driving apparatus.

BACKGROUND OF THE INVENTION

In the newspaper industry and in other industry wherein large rolls of sheet material are continuously replaced and driven from particular drive apparatus, the rolls of sheet material are delivered on a tubular core. In order to mount the roll on the driving apparatus a pair of identical mandrels are utilized. Each of the mandrels in the past were made of steel. Each mandrel was wedged into an end of the core with one mandrel at each end of the core. The mandrels had key recesses extending along the axis thereof and the drive member fitted within the key recesses to drive the mandrel and, thus, the roll of sheet material. However, these mandrels had to be replaced after only a few uses as the steel would become deformed due to the required wedging action of the mandrel within the core. And, further, by reason of the extremely heavy loads on said mandrel. Since the steel mandrels were both expensive and heavy, there was a considerable waste in this type of drive mechanism for the rolls.

The present invention contemplates the use of a mandrel generally in the same shape as the prior art device, but which is manufactured of a material which will be resilient, have a high tensile strength, light in weight, and its elongation at breach will be high. The material selected for this purpose was a polyurethane having a specific gravity of 1.14 grams per cubic centimeter; an elasticity of 420%; a durometer reading of between 70 Shore A and 95 Shore A and between 50 Shore D and 75 Shore D; a tensile strength of 5000 pounds per square inch; and an elongation at breach of 400%. The polyurethane will have a weight advantage over steel of 1 to 6. Thus, the present invention contemplates the use of a deformable mandrel which will be better able to wedge itself within the core of the roll and, further, will be better able to absorb the heavy loads on the mandrel without permanent deformation. The elastic properties of this mandrel are extremely useful for extending the life thereof because by returning the mandrel to its original shape the mandrel becomes more economic than its steel counterpart even if the initial cost of the mandrel is higher. In actual fact, the polyurethane mandrels built in accordance with the principles of the present invention sell on the market place at the same price as their steel counterparts.

One disadvantage that flows from the use of an elastic deformable mandrel is that this would normally make it impossible to securely hold the mandrel on the key drive member of the driving apparatus. In order to avoid this problem, the present invention utilizes a continuous stress bearing member integrally molded on the inner surface of the key recess of the mandrel, which continuous stress bearing member has nuts welded thereto for receiving set screws or the like which can thus be utilized to hold the mandrel to the drive member.

For the purpose of illustrating the invention, there are shown in the drawings forms which are presently preferred; it being understood, however, that this invention is not limited to the precise arrangements and instrumentalities shown.

Figure 1:
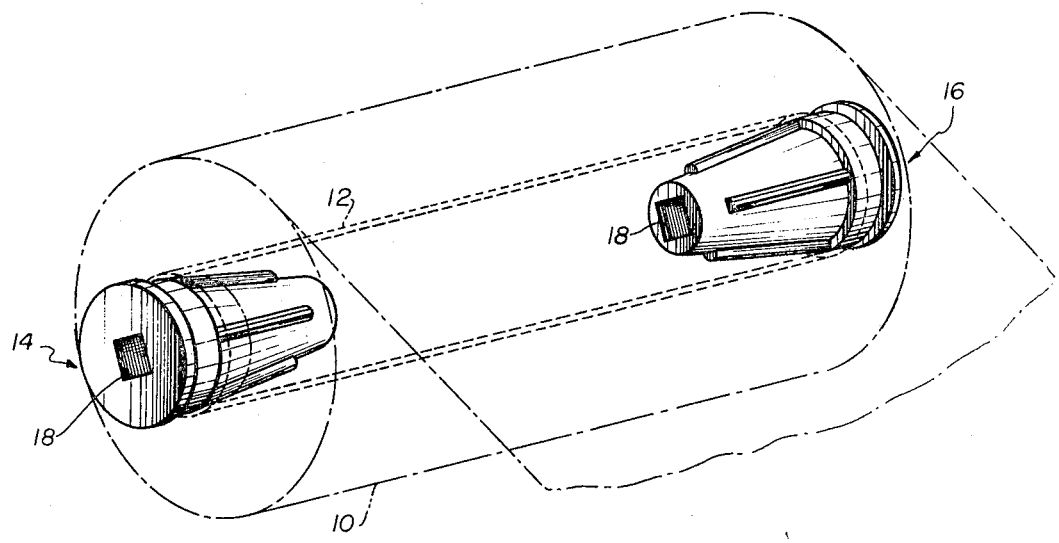
FIG. 1 is a perspective view of one embodiment of the present invention utilized for supporting a roll of sheet material as outlined in phantom lines.
Figure 2:
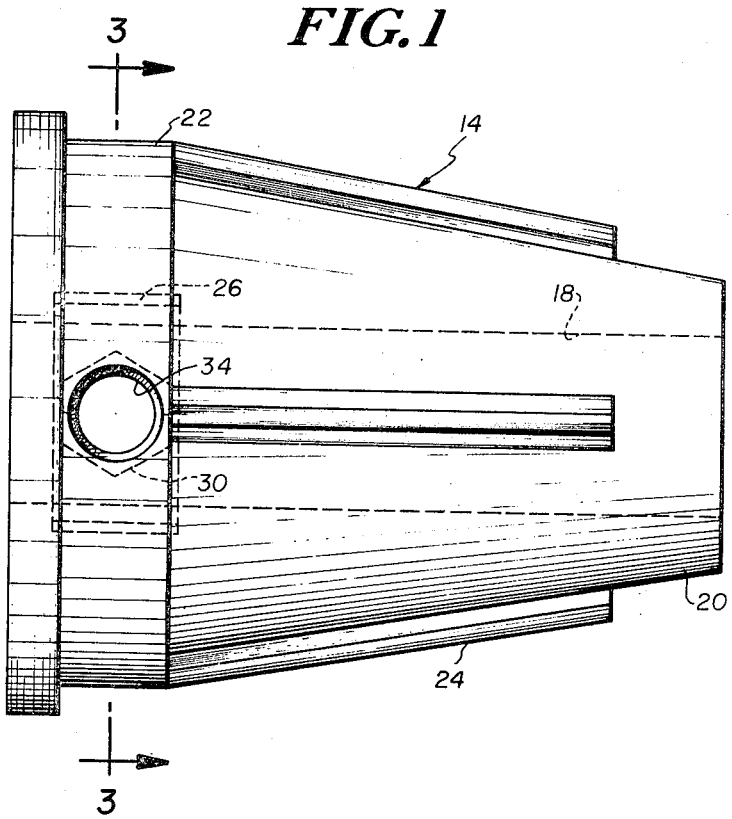
FIG. 2 is a side elevational view of the mandrel shown in FIG. 1.
Figure 3:
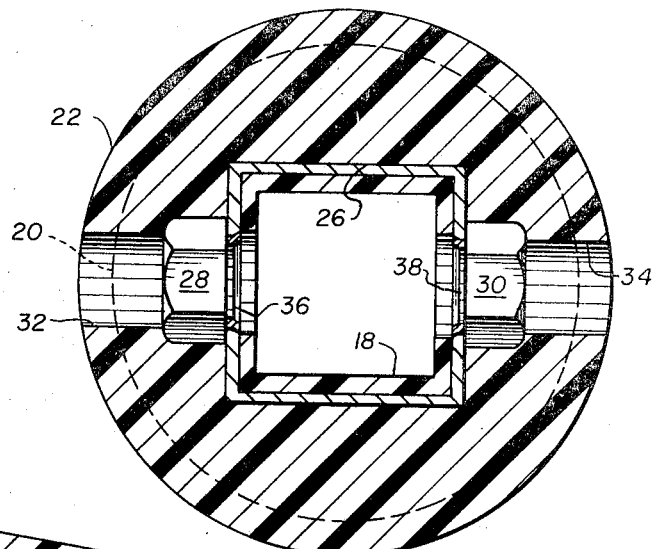
FIG. 3 is a cross sectional view of the mandrel of FIG. 2 taken along lines 3—3.

In FIG. 1, there is shown, in phantom a roll 10 having a central tubular core 12. A pair of mandrels 14 and 16 are inserted into the outer ends of core 12 to provide a resultant central member which can be driven by a drive assembly. The mandrels 14 and 16 each have a central square cut key recess 18 for receiving a square hub from the drive assembly for the roll 10. For the purposes of this disclosure, only mandrel 14 will be described in detail it being understood that mandrel 16 is an exact copy thereof. The mandrel 14 includes, a frusto-conical portion 20 which, as shown in the drawings at its large end with a cylindrical end portion 22. On the surface of the frusto-conical portion 20, there extend ribs 24 which have one end abutting the cylindrical portion 22 and the other end extending toward the axis of the frusto-conical portion 20 shown toward the small end thereof. There are four ribs 24 spaced about the surface of the frusto-conical portion 20. It is intended that when the mandrel is inserted in the core 12, the wedge shaped frusto-conical portion 20 will have its integral ribs 24 in contact with the inner surface of the core 12.

Within the cylindrical portion 22 there is positioned an endless stress bearing member 26. The endless stress bearing member 26 is a steel band which conforms to the shape of the key recess 18. In the embodiment shown, the key recess 18 is square in cross section and, accordingly, the stress bearing member 26 is square in cross section. A pair of nuts 28 and 30 are welded to two opposite outer leg surfaces of the stress bearing member 26 and each of the nuts 28 and 30 is in line with a suitable opening 32 and 34 respectively in the cylindrical portion 22 and, further, with holes 36 and 38 in the stress bearing member 26.

It will easily be understood that the stress bearing member 26 with its welded nuts 28 and 30 in place is an integral part of the mandrel 14 by reason of the fact that the mandrel 14 is molded with the stress bearing member 26 and nuts 28 and 30 positioned within the mold so as to form a unitary structure. The mandrel 14 is normally manufactured of an elastic material with high tensile strength. In a preferred embodiment the mandrel 14 was manufactured of polyurethane having a specific gravity of 1.14 grams per cubic centimeter; an elasticity of 420%; a durometer reading of 70 to 95 Shore A and 50 to 75 Shore D; a tensile strength of 5000 pounds per square inch and an elongation at breach of 400%. The overall weight of the polyurethane is ⅙ that of steel. Although polyurethane was found to be most desirable, other rubber silicones, nylons, or materials having similar properties could be utilized within the teachings of the present invention.

In operation, the mandrel 14 first is placed on a square shaped hub of a drive mechanism, which square-shaped hub fits within the square-shaped key recess 18. Then, a pair of set screws are inserted through the openings 32 and 34 and secured through bolts 28 and 30. The forces on the stress bearing member 26 will hold the mandrel on the hub without fear of loosening. Without the stress bearing member 26, under load, the key-shaped recess 18 would normally be deformed and cause the mandrel 14 to slip around on said drive hub. The stress bearing member 26 prevents this type of slipping or deformation and, accordingly, the mandrel 14 will remain on the square shaped hub of the drive assembly in the same manner as the prior art steel mandrels which also were held by set screws.

Figure 4:
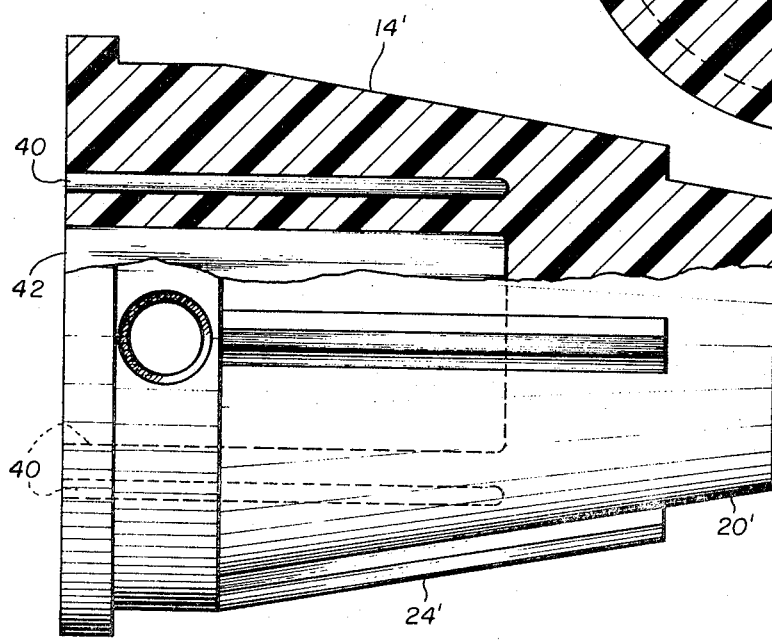
FIG. 4 is a partially broken away view of a second embodiment of the present invention.
Figure 5:
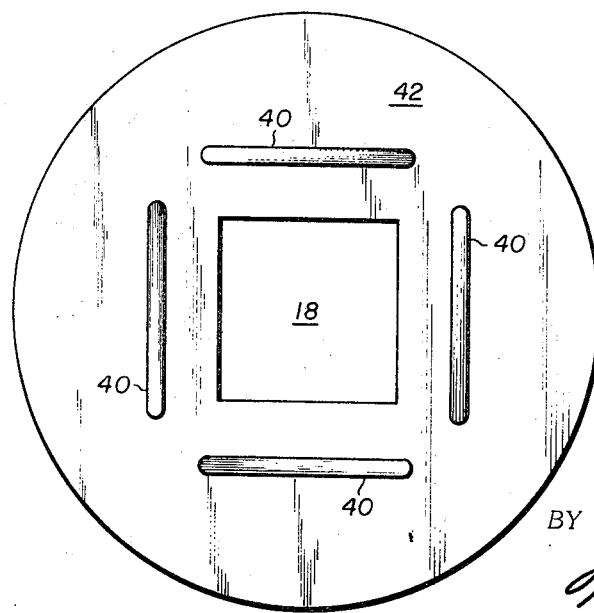
FIG. 5 is a left side elevational view of the mandrel of FIG. 4.

In FIG. 4, there is shown a second embodiment of the present invention substantially similar to the first embodiment of the present invention. For this reason, all similar elements will be indicated with prime numerals. The second embodiment 14' is substantially similar to the first embodiment mandrel 14 and includes a frustoconical portion 20', cylindrical portion 22', and frictional engaging ribs 24' extending along the outer surface of the frustoconical portion 20'. In order to increase the elasticity of the mandrel without changing the material thereof, it is possible, as shown in FIG. 4, to provide a plurality of recesses 40 which extends from the flat wide surface 42 of the mandrel 14' to a point substantially within the frustoconical portion 20' parallel to the axis of the mandrel 14. As shown best in FIG. 5, there are four such recesses 40 each one parallel to a side wall of the key recess 18'. This would in no way affect the operation of the set screws which are secured in place through the stress bearing member (not shown).

The greater elasticity obtained with the openings 40 better enables the mandrel 40' to perform its wedging function. It will be understood that with the elasticity of sheet material of claim 2 wherein said continuous and deformation without permanent injury and, accordingly, is far more economical than its steel predecessors.

We claim as our invention:

1. A mandrel for fitting within the core of a roll of sheet material comprising a main body having an axis and being manufactured of a deformable elastic material, said main body having an axial wedge-shaped end whereby it may be wedged into the core of a roll of sheet material, the other axial end of said main body having a key recess extending axially therein to receive a key shaft from a driving means, and a continuous stress bearing band extending around the inner surface of said key recess and integral with said main body to restrain said main body on said key shaft.

2. The mandrel for fitting within the core of a roll of sheet material of claim 2 wherein said continuous stress bearing band is made of steel and conforms to the inner surface of said key recess.

3. The mandrel for fitting within the core of a roll of sheet material of claim 2 wherein said continuous stress bearing band includes at least one nut secured thereto, said band having an opening therethrough with the threaded passageway of said nut coaxial therewith, said main body having an opening connected to said nut threaded passageway and band opening.

4. The mandrel for fitting within the core of a roll of sheet material of claim 2 wherein said key recess is square in cross section and extends uniformly from one axial end of said recess body to the other.

5. The mandrel for fitting within the core of a roll of sheet material of claim 1 wherein said main body is made of a material having an elasticity of approximately 420%, a durometer reading of between 70 Shore A and 95 Shore A and between 50 Shore D and 75 Shore D, a tensile strength of 5000 pounds per square inch and an elongation at breach of 400%.

6. The mandrel for fitting within the core of a roll of sheet material of claim 1 wherein said main body is made of polyurethane.

References Cited

UNITED STATES PATENTS

| | | | |
|---|---|---|---|
| 1,878,264 | 9/1932 | Claybourn | 242—72 |
| 2,697,563 | 12/1954 | Miller | 242—68.2 |
| 2,903,200 | 9/1959 | McDougall et al. | 242—68.2 |

NATHAN L. MINTZ, Primary Examiner